(12) United States Patent
Roberts et al.

(10) Patent No.: US 11,799,091 B2
(45) Date of Patent: Oct. 24, 2023

(54) REDOX-ACTIVE INTERFACES FOR ACCELERATED LIQUID-SOLID CHARGE TRANSFER REACTIONS

(71) Applicant: Clemson University, Clemson, SC (US)

(72) Inventors: Mark E. Roberts, Clemson, SC (US); Robert K. Emmett, Clemson, SC (US); Stephen E. Creager, Clemson, SC (US)

(73) Assignee: Clemson University, Clemson, SC (US)

( * ) Notice: Subject to any disclaimer, the term of this patent is extended or adjusted under 35 U.S.C. 154(b) by 3 days.

(21) Appl. No.: 17/224,429

(22) Filed: Apr. 7, 2021

(65) Prior Publication Data

US 2021/0320305 A1    Oct. 14, 2021

Related U.S. Application Data

(60) Provisional application No. 63/006,771, filed on Apr. 8, 2020.

(51) Int. Cl.
| | | |
|---|---|---|
| *H01M 4/90* | (2006.01) | |
| *H01M 8/18* | (2006.01) | |
| *H01M 8/08* | (2016.01) | |
| *H01M 4/86* | (2006.01) | |

(52) U.S. Cl.
CPC ........... *H01M 4/9008* (2013.01); *H01M 8/08* (2013.01); *H01M 8/188* (2013.01); *H01M 2004/8684* (2013.01); *H01M 2004/8689* (2013.01); *H01M 2300/0011* (2013.01)

(58) Field of Classification Search
CPC ....... H01M 8/08; H01M 8/188; H01M 4/9008
See application file for complete search history.

(56) References Cited

U.S. PATENT DOCUMENTS 10,930,937 B2    2/2021   Millard et al.
2014/0295311 A1*  10/2014  Lipka .................... H01M 8/188
                                                            429/498

OTHER PUBLICATIONS

Emmett et al.; "Can Faradaic Processes in Residual Iron Catalyst Help Overcome Intrinsic EDLC Limits of Carbon Nanotubes?" The Journal of Physical Chemistry; publ. Oct. 29, 2014.
Rao et al.; "In-Situ-Grown Carbon Nanotube Array with Excellent Field Emission Characteristics" Applied Physics Letters; Pub. Jun. 12, 2000; p. 3813-3815.
Hwang; "Efficient Cleavage of Carbon Graphene Layers by Oxidants" J. Chem. Soc., published Jan. 1, 1995; pp. 173-174.

* cited by examiner

*Primary Examiner* — Karie O'neill Apicella
(74) *Attorney, Agent, or Firm* — Joseph T. Guy; Patent Filing Specialist Inc.

(57) ABSTRACT

Provided herein is a redox flow battery comprising an anode comprising anodic redox mediators; a negative electrolyte tank comprising an anolyte; and an anode pump capable of circulating the anolyte through the anode. The redox flow battery further comprises a cathode comprising cathodic redox mediators; a positive electrolyte tank comprising a catholyte and a cathode pump capable of circulating the catholyte through the cathode. A separator is between the anode and cathode.

34 Claims, 13 Drawing Sheets

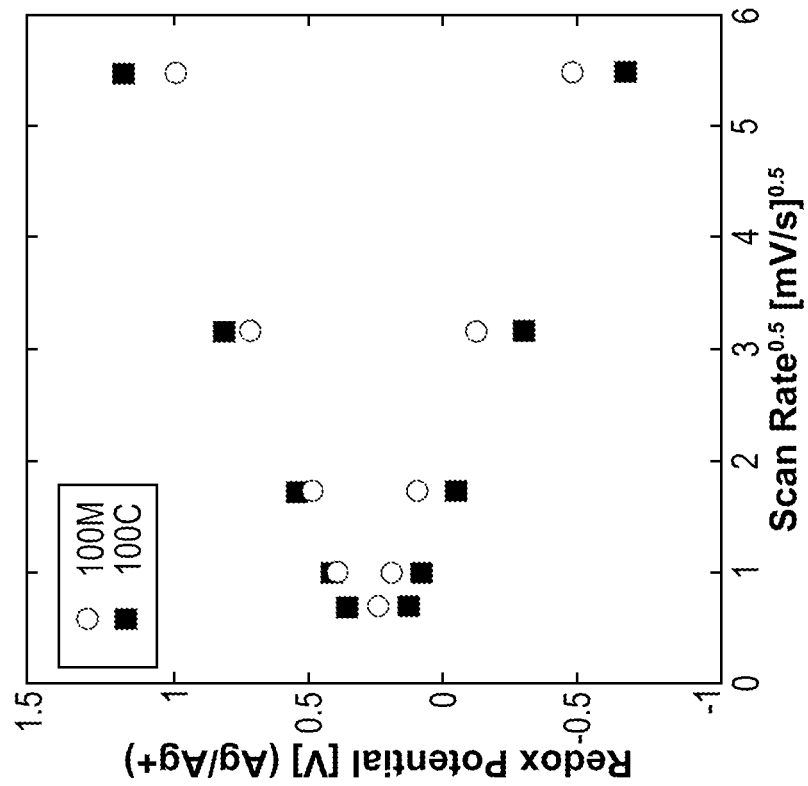
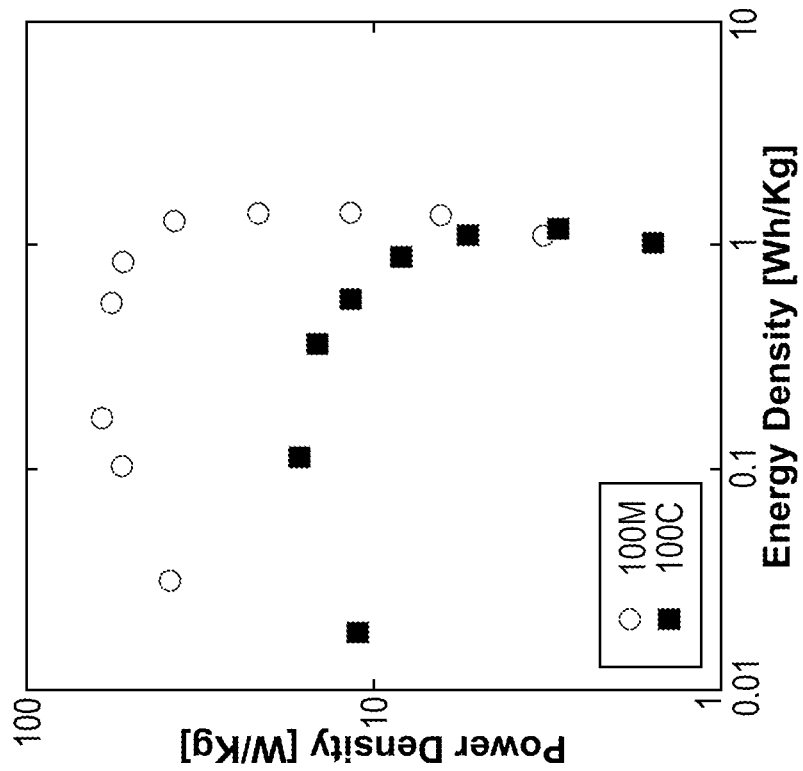
Fig. 4d
Fig. 4c

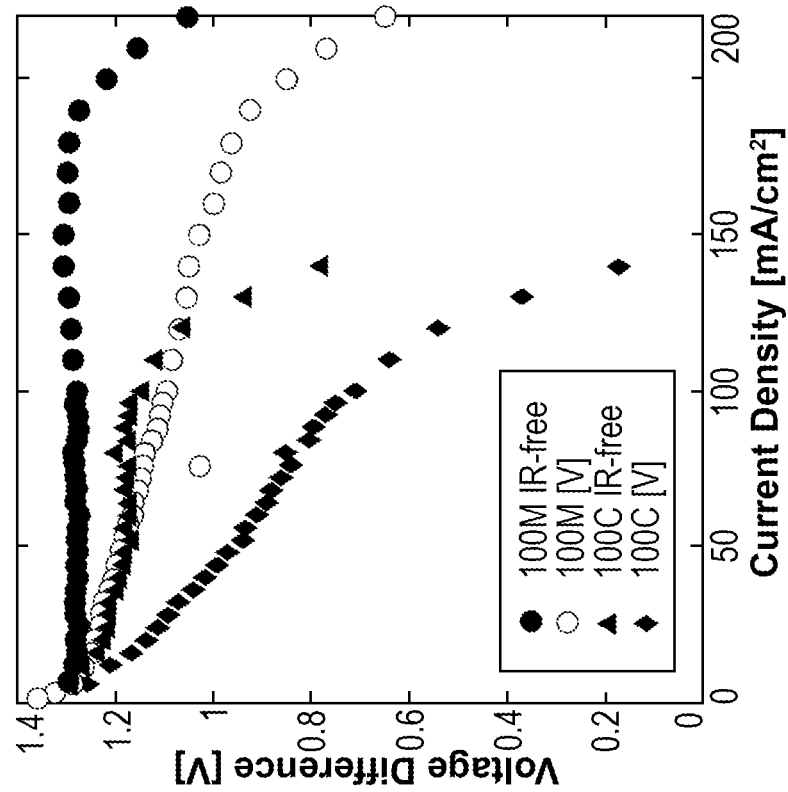
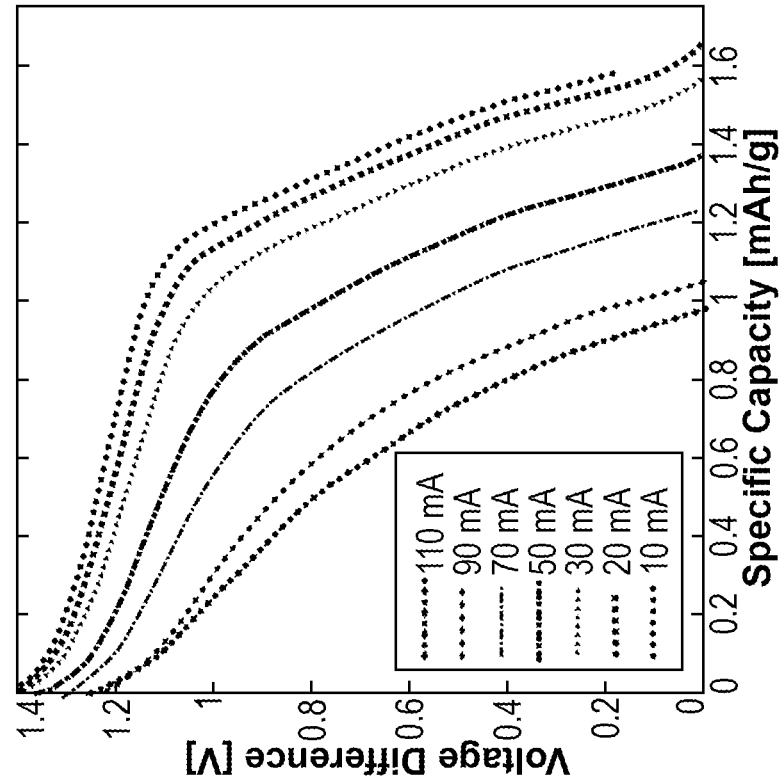
Fig. 6b
Fig. 6a

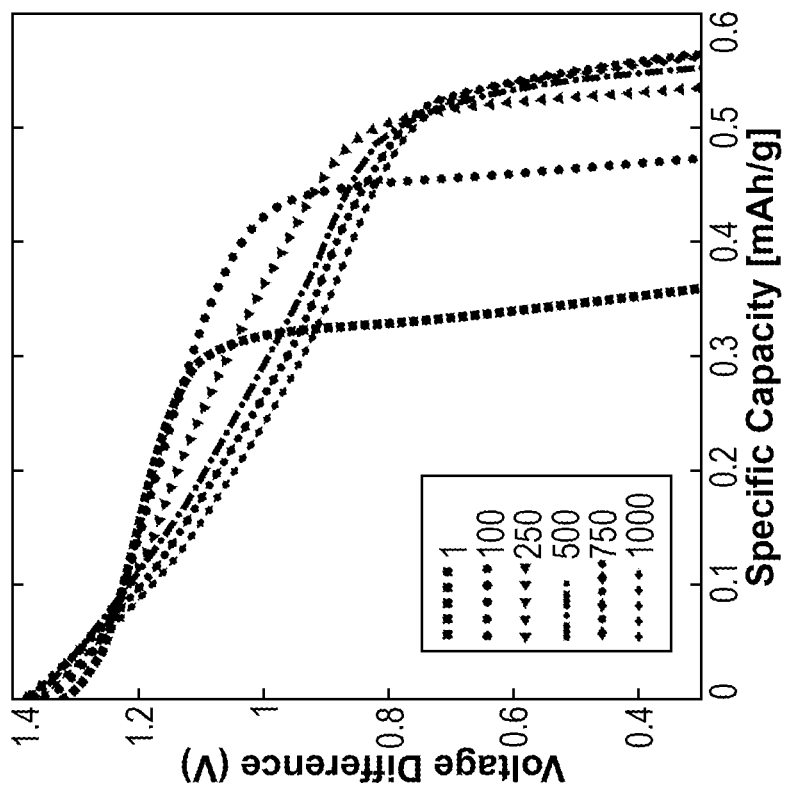
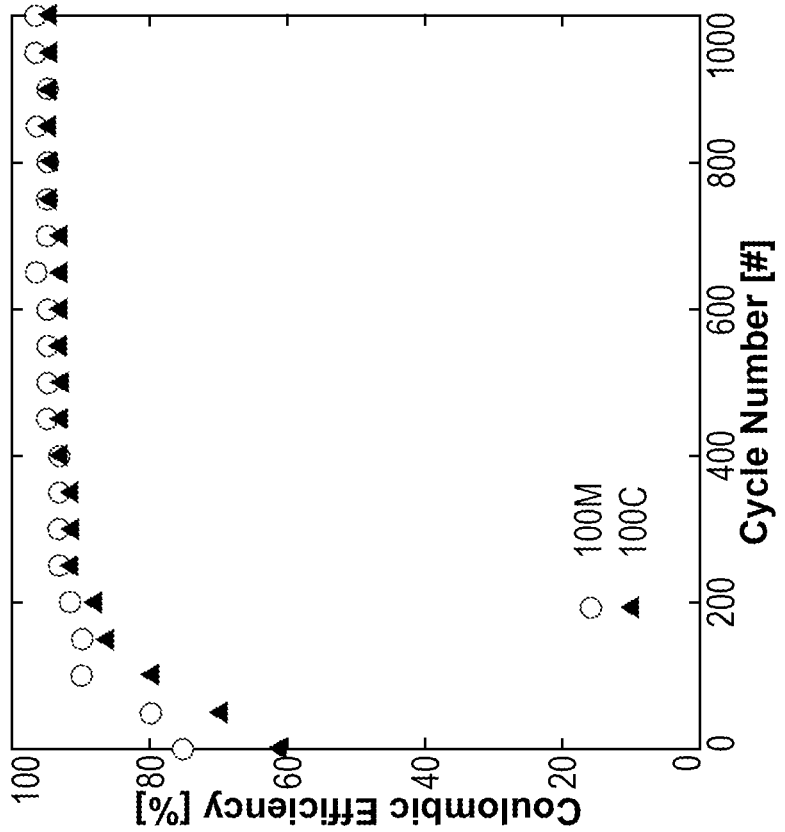
Fig. 7a
Fig. 7b

REDOX-ACTIVE INTERFACES FOR ACCELERATED LIQUID-SOLID CHARGE TRANSFER REACTIONS

CROSS-REFERENCE TO RELATED APPLICATIONS

This application claims priority to U.S. Provisional Patent Application No. 63/006,771 filed Apr. 8, 2020 which is incorporated herein by reference.

STATEMENT OF FEDERALLY SPONSORED RESEARCH OR DEVELOPMENT

This invention was made with government support under grant #1246800 awarded by the National Science Foundation. The government has certain rights in the invention.

FIELD OF THE INVENTION

The present invention is related to improved redox flow batteries (RFBs) and particularly RFBs based on, preferably but not limited to aqueous, redox chemistry. More specifically, the present invention is related to improved electrodes modified with redox-active particles to improve power and energy densities in RFBs.

BACKGROUND

Future energy generation systems are increasingly focused on harvesting energy from alternative sources, such as wind and solar energy. Due to the intermittent nature of these sources, energy storage systems will need to be implemented to bridge the gap between non-continuous energy supply and on-demand grid systems to minimize infrastructure modifications. The high degree of scalability has driven redox flow batteries (RFBs) to the forefront to satisfy the enormous storage demand needed to convert communities to wind and solar energy.

The enormous scalability of RFBs has led to considerations for many applications, especially because the energy density and power density are decoupled. The power density is dependent on the rate of charge transfer at the electrode/electrolyte interface whereas energy density is dependent on redox capacity of the electrolyte. Therefore, the power density can be scaled by increasing the area of active electrode materials and the energy density can be increased by expanding the volume of external electrolyte holding tanks. RFBs have two separate redox electrolytes stored in isolated tanks that are pumped to the electrodes to make up the electrochemical cell where Faradaic charge transfer reactions occur. Redox electrolytes are stable in solution in multiple oxidation states to facilitate the oxidation and reduction processes. Limiting elements of RFBs are low energy densities, due to redox solute solubility, low power densities, due to slow charge transfer reactions and large overpotentials, high raw material costs, and ion crossover that degrade the battery's performance over time.

Vanadium RFBs have received the most attention because they have high electrochemical performance and diminished ion crossover due to similar vanadium ions for both electrolytes. Extensive research into improving RFBs has been conducted on the electrolyte, although little innovation has been applied to the carbon electrodes. However, vanadium is relatively expensive which has led to efforts to form RFB's with other transition metals having various redox states which are more economically advantageous. Iron and Zinc, on the other hand, are relatively cheap and readily available; however, RFB's based on such chemistries have not proven suitable due to their reduced electrochemical performance compared to vanadium RFBs. The use of iron, zinc or other non-vanadium, based RFBs have been limited by mediocre Faradaic charge transfer interactions at the electrode/electrolyte interface.

The present invention provides improved performance of any specific redox flow battery chemistry. In particular the present invention overcomes the inferior properties of iron-based and zinc iodide RFBs.

SUMMARY OF THE INVENTION

The present invention is related to improvements in the electrical performance of redox flow batteries, particularly those based on redox electrolytes with iron or zinc iodide redox solutes.

More specifically, the present invention is related to the use of electrodes modified with redox mediators, or active redox components, which can be formed by oxidatively activating carbon materials containing iron or other redox active materials, particularly iron nanoparticles. Alternatively, the active redox components can be formed by coating redox active materials on carbon surfaces, which improve power and energy densities of RFBs, particularly RFBs based on iron redox chemistry.

A particular feature is the ability to provide a power storage system which is particularly suitable for use as a fixed energy storage unit for various energy generation environments such as solar, wind, tidal and the like.

These and other embodiments, as will be realized, are provided in redox flow battery. The redox flow battery comprises an anode comprising an anodic redox component, a negative electrolyte tank comprising an anolyte and an anode pump capable of circulating the anolyte through the anode. The redox flow battery also comprises a cathode comprising a cathodic redox component, a positive electrolyte tank comprising a catholyte and a cathode pump capable of circulating the catholyte through the cathode. A separator is between the anode and cathode.

Yet another embodiment is provided in a method for forming a redox flow battery. The method comprises:
forming an anode electrode comprising an anode carbon material comprising an anode redox component;
introducing the anode electrode to an anolyte to form an anode;
forming a cathode electrode comprising a cathode carbon material comprising a cathode redox component;
introducing the cathode to a catholyte to form a cathode;
forming a sandwich with a separator between the anode and cathode;
providing an anolyte source to exchange the anolyte; and
providing a catholyte source to exchange the catholyte.

BRIEF DESCRIPTION OF DRAWINGS

FIGS. 4*a*-4*f* graphically illustrates the electrochemical performance of electrodes in the simulated half-cell configuration with the catholyte.

FIGS. 6a-6d graphically illustrates coin-cell configuration results with the anolyte and catholyte separated by Nafion™.

FIGS. 7a-7d graphically illustrates the stability of the invention as determined in a coin cell configuration.

DESCRIPTION

Figure 1:
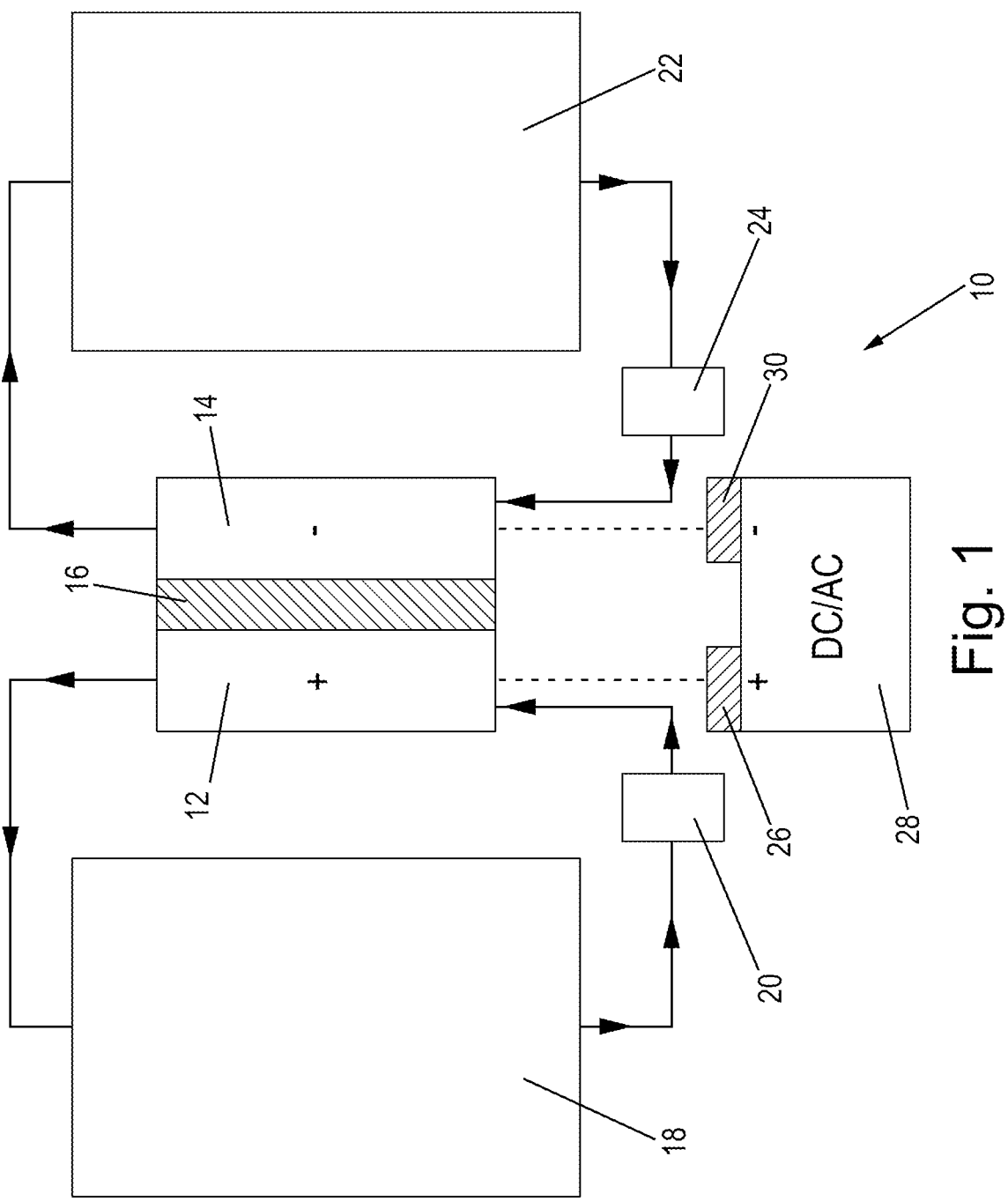
FIG. 1 is a schematic representation of a redox flow battery.

The present invention provides for an increase in the electrochemical performance of, particularly iron or zinc, RFBs by modifying the electrodes, preferably iron based, active redox components by oxidatively activating the active redox component at the interface of the anode or cathode to create active redox components which function as redox mediators thereby improving the efficiency of charge transfer between the redox electrolyte and anode or cathode. The modified electrodes have improved power and energy densities which is particularly advantageous when using aqueous redox flow battery chemistries, and particularly with iron- or zinc iodide-based chemistries. These modifications allow for decreased raw material cost with reduced quantities of transition metals and separator, such as Nafion™ membrane separators. The invention provides for improved power which is necessary to store energy from intermittent sources of energy.

Active redox components, such as iron nanoparticles, are added to preferably carbon based, preferably graphitic or carbon felt, electrodes to decrease the activation energy for charge transfer at the electrode/electrolyte interface. The decreased activation energy results in an increased voltage efficiency and allows for higher discharge current densities, which leads to power densities that are more than 2.5× higher than non-modified electrodes. Modified electrodes also exhibit about a 50% increase in energy density due to increased electrolytic conversion. Enhanced power and energy density improves the energy harvesting efficiency of RFBs and therefore diminishes the quantity of expensive polymer membrane separators, transition metal salts, and required infrastructure. The enhanced power, enhanced energy density and reduction in materials permits this technology to be more widely applicable to communities.

The electrochemical performance of redox flow batteries (RFBs), particularly based on chemistries containing iron or zinc iodide redox solutes, is improved by incorporating iron faradaic mediators into the electrodes. Unpurified carbon nanotube electrodes synthesized from a ferrocene-xylene chemical vapor deposition process that contain residual iron catalysts are oxidatively activated to create active redox components which function with the iron redox solutes for improved Faradaic charge transfer. The improved Faradaic charge transfer reduces losses associated with kinetical, ohmic, and mass transfer resistances.

An embodiment of the invention includes electrodes, functioning as the anode and cathode, particularly comprising iron-containing carbon nanotube electrodes, activated utilizing cyclic voltammetry (CV). Activation with CV can be done in an acidic environment to initiate charge transfer interactions between redox electrolytes and iron nanoparticles in the electrode. Iron-containing carbon nanotube electrodes can also be activated using chemical oxidants, such as potassium permanganate. In some embodiments modified inventive electrodes experienced as much as a 141% increase in power density and as much as a 56.5% increase in energy density in coin cell configurations. The economic value and ready availability of iron, paired with enhanced performance, makes iron RFBs a viable option in many applications. The anode and cathode are preferable the same. For the purposes of clarity, the active redox component of the anode will be referred to as anode redox component and the active redox component of the cathode will be referred to as cathode redox component.

Creating RFBs with iron catholytes and anolytes, or with zinc anolyte and polyiodide catholyte, is paramount to acquire reduced ion crossover degradation that is competitive with vanadium RFBs. Iron, like vanadium, has many different oxidation states and therefore can produce the same redox active elements for catholyte and anolyte systems. Aqueous chemistries are particularly preferred for grid-scale energy storage with both acidic and alkaline chemistries available for all iron RFBs. Iron and zinc based RFBs have the advantage of relatively low raw material costs, high metal availability, and they offer diminished chemical toxicity. The best performing alkaline systems comprise carbon-based electrodes containing a maximum redox potential of about 1.2 V. These voltages can be obtained at low current densities. By incorporating iron redox mediators, as the active redox component, into the electrode, these high aqueous voltages can be preserved at higher charging and discharging currents leading to high power and energy densities. Organic ligands are preferable to produce an anolyte with soluble iron ions to form iron complexes needed to achieve low voltage, anodic potentials. All-iron RFBs with unmodified electrodes have a power density between 50-80 mW $cm^{-2}$, in coin cell configurations. With the inventive electrodes the improved electrochemical performance of iron RFBs, paired with their economic value and availability, render these batteries suitable for use in emerging community scale energy storage.

Redox mediators are a redox active material selected from polymers or small molecular organic compounds having a low molecular weight, organometallic particles comprising transition metals, transition metal oxides or transition metal carbides. Preferred redox mediators are organometallic particles comprising transition metals, transition metal oxides or transition metal carbides. Particularly preferred is a transition metal selected from the group consisting of Fe, Ru, Co, Ni, Cu, Zn, Mn, Cr, Mo and V. More preferably the transition metal is selected from the group consisting of Fe, Ni, Cu, Zn, Mn and Cr. Even more preferred the transition metal is Fe.

The invention will be described with reference to the figures forming an integral, non-limiting, component of the disclosure. Throughout the various figures similar elements will be numbered accordingly.

A redox flow battery, or RFB, is illustrated schematically in FIG. 1. The RFB, 10, comprises a cathode, 12, and anode, 14, separated by a membrane, 16. In the present invention the cathode and anode are improved. The membrane separates the anode from the cathode as understood in the art. A positive electrode tank, 18, contains a charged catholyte that has a relatively positive electrochemical potential which is circulated through the cathode of the RFB by a cathode pump, 20. A negative electrolyte tank, 22, contains a charged anolyte that has a relatively negative electrochemical potential which is circulated through the anode by an anode pump, 24. The cathode is in electrical contact with the source cathode, 26, of an energy source, 28, and the anode is in electrical contact with a source anode, 30, of the energy source. During the discharge phase of the reaction the electrolytes are pumped out of the tanks and in to the RFB thereby allowing for the discharged electrons to be released in the form of electricity when an energy demand requires.

Flowing electrons that continue through the electrode core and are returned back to the electrolyte tanks represent the charging phase of the reaction.

The anolyte comprises charged components that have a relatively negative electrochemical potential is a carrier medium. Particularly preferred for the anolyte are charged iron compounds such as iron (III) sulfate and iodine salts such as sodium iodide, or zinc anolyte. The catholyte comprises charged components that have a relatively positive electrochemical potential is a carrier medium. Particularly preferred for the catholyte are positively charged iron compounds such as $K_3Fe(CN)_6 \cdot 3H_2O$ or zinc salts such as zinc chloride and polyiodide catholyte. A particularly preferred salt for the anolyte and catholyte is zinc iodide wherein the zinc is active in the anolyte and the polyiodide is active in the catholyte.

The carrier medium is preferably liquid and can be selected from water, and organic solvent and an ionic liquid.

The carbon-based electrodes can be formed from graphitic carbon, porous carbon, carbon felt, allotropes of carbon, carbon nanotubes (CNT), or other forms of carbon. CNTs are useful due to their high conductivity and their stable chemical, mechanical, and physical properties, particularly when soaked in aqueous conditions. C-grade nanotubes, referred to herein as "C-CNT" and M-grade nanotubes, referred to herein as "M-CNT" are suitable for demonstration of the invention and both are available commercially from NanoTech Labs. C-CNT nanotubes have an average diameter of about 50 nm and an average length of about 10 μm. M-CNT nanotubes have an average diameter of about 70-80 nm and an average length of about 10 μm. M-CNT electrodes contain residual iron nanoparticles in the caps of the nanotubes from ferrocene/xylene synthesis process commonly used to produce CNTs as described in A. M. Rao, D. Jacques, R. C. H. Zhu, C. Bower, S. Jin, A. M. Rao, D. Jacques, R. C. Haddon "In situ-grown carbon nanotube array with excellent field emission characteristics", 3813 (2002) 1998-2001, doi:10.1063/1.126790 which is incorporated herein by reference. Alternatively, various forms of carbon or carbon nanotubes lacking iron particles within the nanotubes can be treated with other redox precursors to create redox active sites. Iron nanoparticles are not available for activating in C-CNT electrodes. To make electrodes, the CNTs can be sonicated with sodium dodecyl sulfate (99% Sigma Aldrich) in water for 30 minutes and then vacuum filtered with nylon membranes to produce buckypaper electrodes. A 0.47 μm Millipore filter is exemplary for demonstration of the invention. The electrodes are dried before use and are activated in acidic conditions as known in the art. The carbon nanotubes can also be activated using potassium permanganate in acidic solutions prior to forming the buckypaper electrodes.

To demonstrate the invention, carbon nanotube buckypaper can be prepared by first sonicating the carbon nanotubes to disperse the CNTs. The dispersed CNTs are then filter deposited on a substrate. Carbon nanotube buckypaper electrodes can be fabricated by suspending multi-walled CNTs (MWMTs) in 1% aqueous solution of sodium dodecyl sulfate (SDS). A tip sonicator probe; such as a ⅛" diameter, Branson 250 probe; with a power of 60 W for 15 minutes at concentrations ranging from 0.04-0.2 mg/mL is suitable for demonstration of the invention. Subsequently, the suspension could be poured onto a polyamide filtration membrane; such as a Whatman, 0.45 μm pore diameter, filter; and filtered such as by a vacuum filtration setup, such as a Synthware Filtration Apparatus from Kemtech America. The filtrate on the supporting filter membrane could be washed with distilled water followed by washing with methanol to remove the residual SDS followed by oven dried, such as at 80° C., such as overnight. The resulting film can be peeled from the membrane to yield a freestanding buckypaper electrode that is robust and can easily be handled with tweezers and cut with scissors like regular paper.

Activation is preferably achieved by Cyclic Voltammetry (CV). CV is preferably performed at 10 mV s$^{-1}$ from −0.4-1.2 V for catholyte systems and −2-0 V for anolyte systems. After activation, the electrodes can be wicked dry and soaked in redox electrolytes with overnight soaking sufficient to demonstrate the invention. The carbon nanotubes can also be activated using other types of oxidation methods, such as chemical oxidation with potassium permanganate in acidic solutions.

Nafion™ membranes are suitable for demonstration of the invention. Nafion™ 212 membranes with a thickness of 0.05 mm and 0.92 meq/g available commercially from Beantown Chemical are suitable for demonstration of the invention and were employed for all testing reported herein. The membranes can be activated by refluxing sequentially in a) DI water with 3 v % of 30% hydrogen peroxide such as available commercially from Fisher, b) DI water, c) 0.5 M sulfuric acid such as 98% sulfuric acid available commercially from Fisher, d) DI water, and e) 1 M sodium hydroxide such as 99% sodium hydroxide available commercially from Fisher. Refluxing for about an hour in each solution at about 90° C. is suitable for demonstration of the invention.

Nafion™ is preferably stored in 1 M NaOH solution until usage. A catholyte suitable for demonstration of the invention is 0.7 M $K_3Fe(CN)_6 \cdot 3H_2O$, commercially available at 99% from Fisher. An anolyte suitable for demonstration of the invention is 0.35 M ferric sulfate, available commercially at 99% from Fisher, 0.4 M sodium chloride available at 99% from Fisher, 4:1 triethanolamine (TEOA)-to-electrolyte mass ratio available at 99% from Fisher, and 3 M sodium hydroxide. The catholyte is preferably mixed, preferably at about 50° C. for an hour and the anolyte is preferably mixed at about 50° C. for two hours before use.

Figure 2:
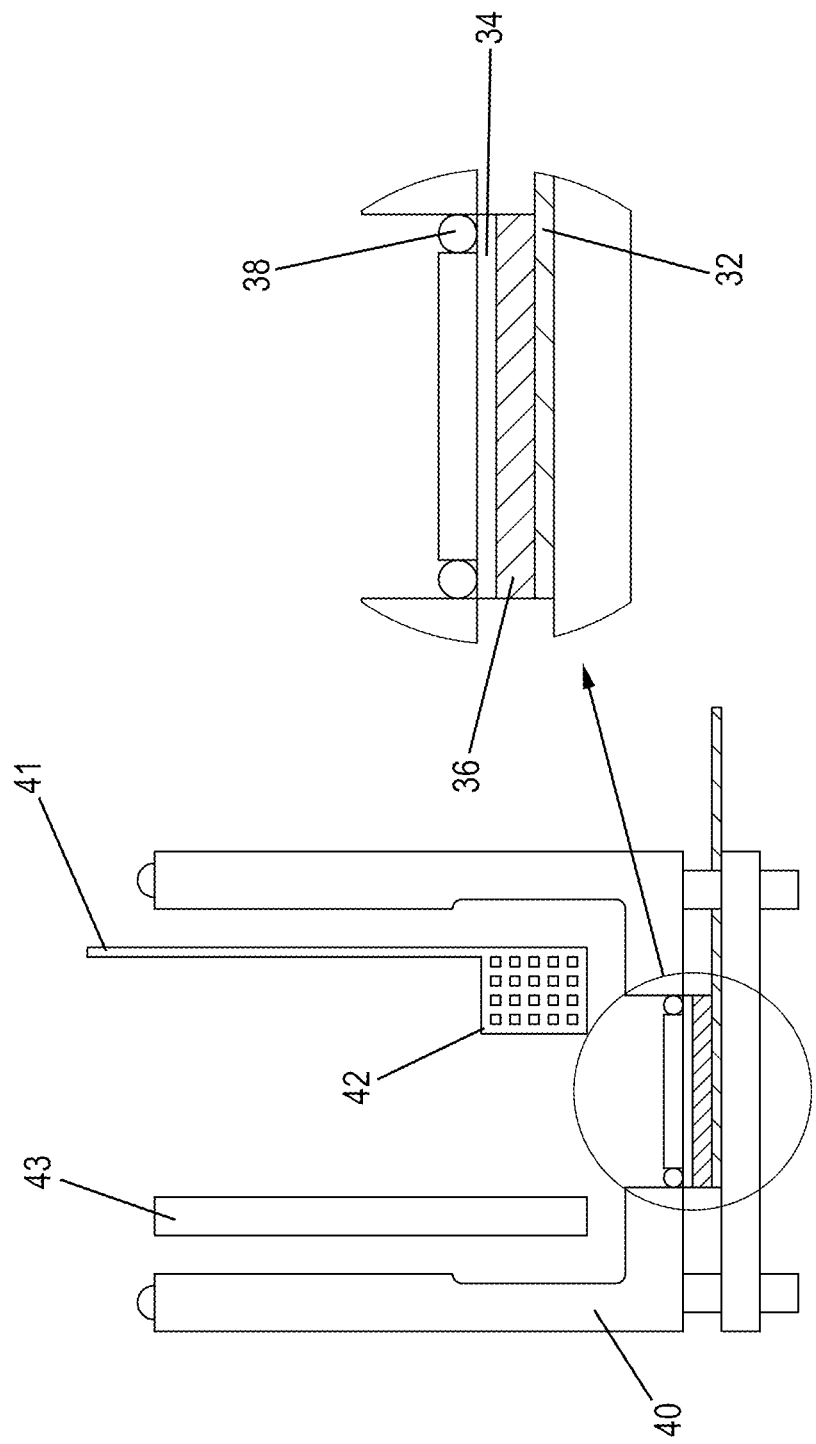
FIG. 2 is schematic representations of electrochemical half-cell testing apparati.

A simulated half-cell configuration will be described with reference to FIG. 2. The half-cell comprises a current collector, 32, such as titanium, and a preferably Nafion™ separator, 34, with electrode, 36, preferably a carbon nanotube electrode, sandwiched there between. A particularly preferred electrode is a carbon nanotube previously soaked in redox electrolyte with the redox electrolyte being either catholyte and anolyte depending on the intended use. Excess electrolyte is preferably wicked off of the redox soaked electrodes before being placed on the current collectors. An o-ring, 38, forms a seal between the basin, 40, and the separator, 34, thereby allowing the separator to be soaked in pure 1 M NaOH electrolyte, 42, contained in the basin. An auxiliary platinum counter electrode, 41, and a Ag/AgCl reference electrode, 43, are placed in the basin. Cyclic voltammetry (CV), electrochemical impedance spectroscopy (EIS), and galvanostatic charge/discharge (CD) testing, can be performed on the half-cell. A Versastudio potentiostat is suitable for demonstration of the invention. For the purposes of demonstration, an active area about 0.5 cm$^2$ and a basin containing about 7 mL of NaOH solution is suitable for demonstration of the invention. Redox electrodes are preferably cycled at 30 mV s$^{-1}$ until they are stable before other electrochemical tests are conducted.

Figure 3:
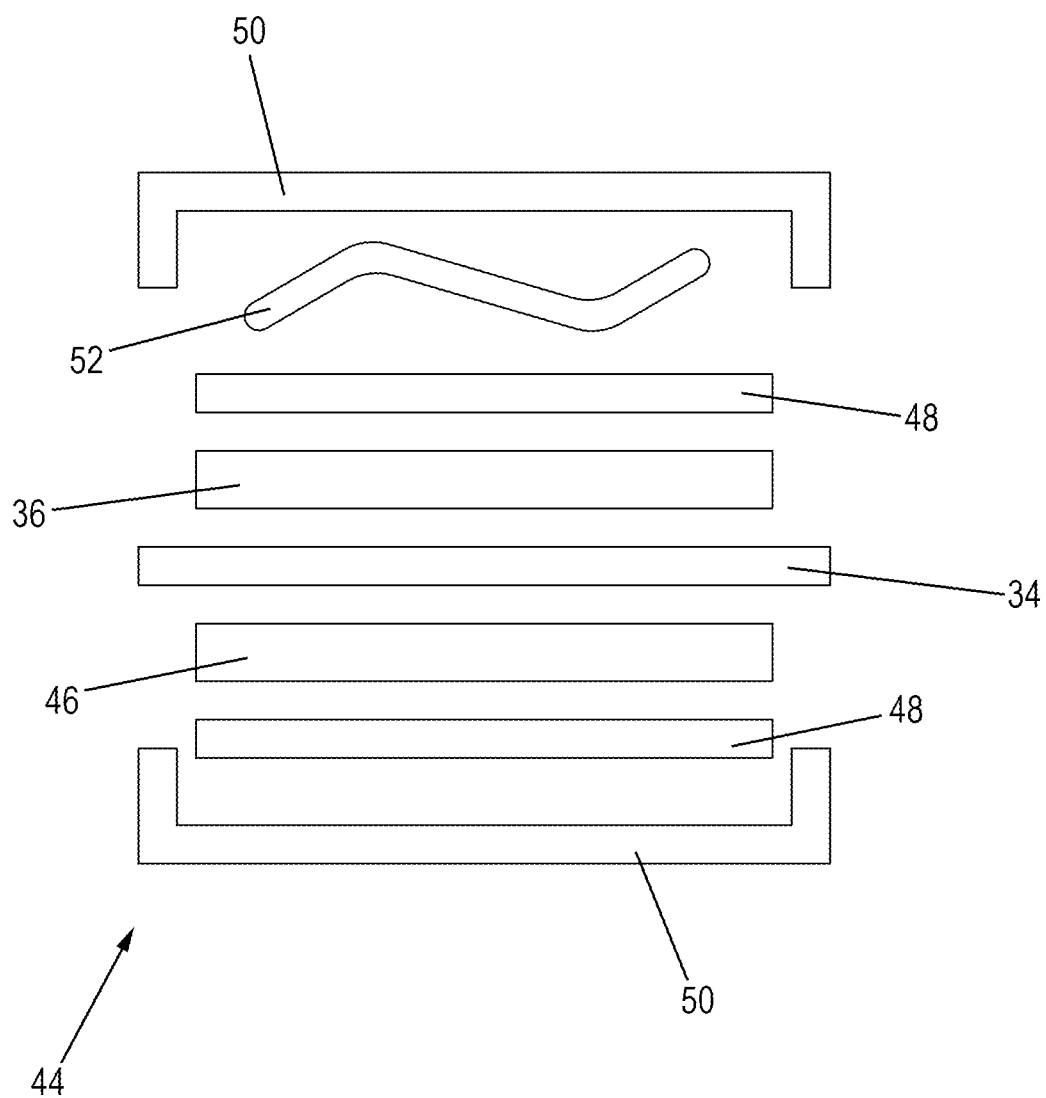
FIG. 3 is a schematic representation of an electrochemical coin cell testing apparati.

A coin cell configuration which will be described with reference to FIG. 3. By way of example, carbon nanotube electrodes are initially activated under acidic conditions previously mentioned and soaked preferably overnight, one in the catholyte and one in the anolyte. Subsequently the soaked carbon nanotube electrodes are wicked to remove excess electrolyte and then combined in the coin cell, 44, at a preferred ratio of 5:6 anolyte to catholyte by mass. Both electrolytes typically have a density of about 1.25 g cm$^{-3}$. Coin cell configurations comprising anolyte soaked electrodes are separated from catholyte soaked electrodes by the separator, 34. The sandwich of anode, 46, and cathode, 36, with a separator, 34, there between, is sandwiched between steel disks, 48, and inserted between caps, 50, with a steel spring, 52 biased towards tighter engagement of the assembly. The batteries are preferably sealed, such as at 1000 psig for 1 minute, followed by oxidative activation of the iron carbon interface to form the iron redox mediator through cyclic voltammetry (CV), such as at 10 mVs$^{-1}$ from 0.5-1.8 V, until stabilization is reached. Standard electrochemical battery experiments can then be undertaken including CV, EIS, and CD. It is preferable that CD experimentation contains a potentiostatic hold for 2 minutes after each charging and discharging cycle.

Carbon Nanotubes (CNTs) are synthesized by chemical vapor deposition, which requires the incorporation of transition metal catalysts, such as iron. A method, suitable for demonstration of the invention is a ferrocene/xylene process that results in iron particles that remains in the cap of the CNT as the tube grows behind the catalyst. In most cases these metal "impurities" are purified from the CNTs with residual amorphous carbon by either an oxidation method or a physical method as described in K. C. Hwang, Efficient cleavage of carbon graphene layers by oxidants, J. Chem. Soc. Chem. Commun. 04 (1995) 173-174. doi:10.1039/C39950000173 which is incorporated herein by reference. The present invention eliminates the necessity of the purification step of CNT synthesis and, instead, utilizes the inherit Faradaic capabilities of the iron particle catalysts to improve the heterogeneous charge transfer at the electrode electrolyte interface. Exposing the nanotube electrodes to high voltage in acidic conditions causes bubbles to nucleate onto the nanoparticle catalysts within the nanotube and then ruptures the CNTs to expose these nanoparticles to enable interaction with the electrolytes. This produces a reversible Faradaic interaction with CNT electrodes as described in R. K. Emmett, M. Karakaya, R. Podila, M. R. Arcila-Velez, J. Zhu, A. M. Rao, M. E. Roberts, Can "Faradaic processes in residual iron catalyst help overcome intrinsic EDLC limits of carbon nanotubes?", J. Phys. Chem. C. 118 (2014) 26498-26503. doi:10.1021/jp5097184 which is incorporated herein by reference.

The redox soaked electrodes are evaluated in simulated half-cell configurations to allow for these devices to obtain steady-state and implements a uniform platform to commence electrochemical experimentation. Cyclic Voltammetry (CV) is performed such as at 10 mV s$^{-1}$ from −0.4-1.2 V for catholyte systems and −2-0 V for anolyte systems. CV scans the potential at a specified rate and measures the resulting current; the peaks are caused by high electron transfer affiliated with redox behavior of the device.

Nafion™ 211 is purified by refluxing the Nafion™ 211 sequentially in 3 v % $H_2O_2$, DI water, 0.5 M $H_2SO_4$, DI water, and 1M NaOH all for an hour at 90° C.

Figure 4B:
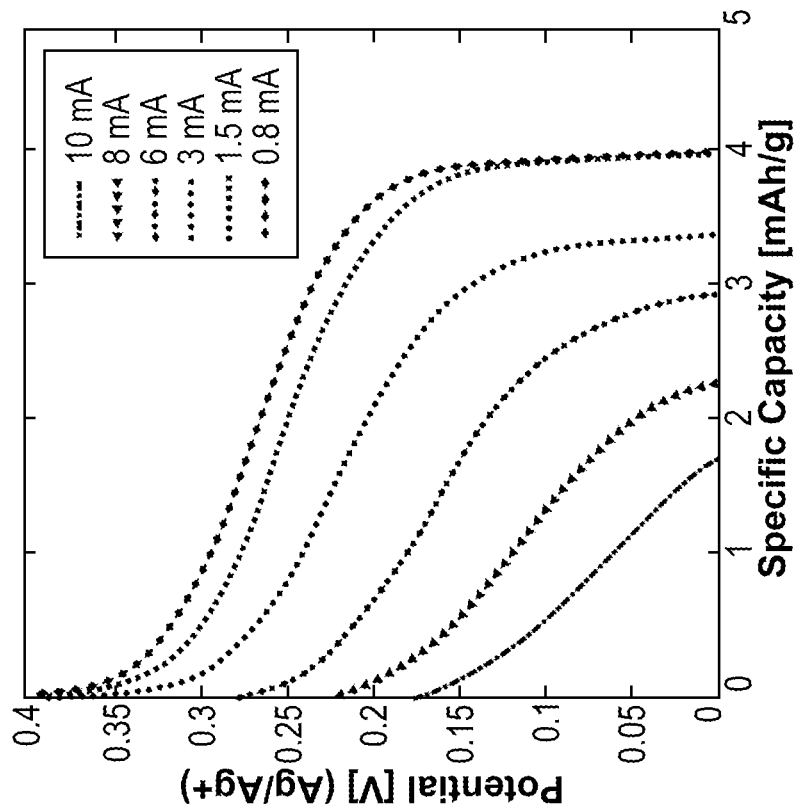
Figure 4A:
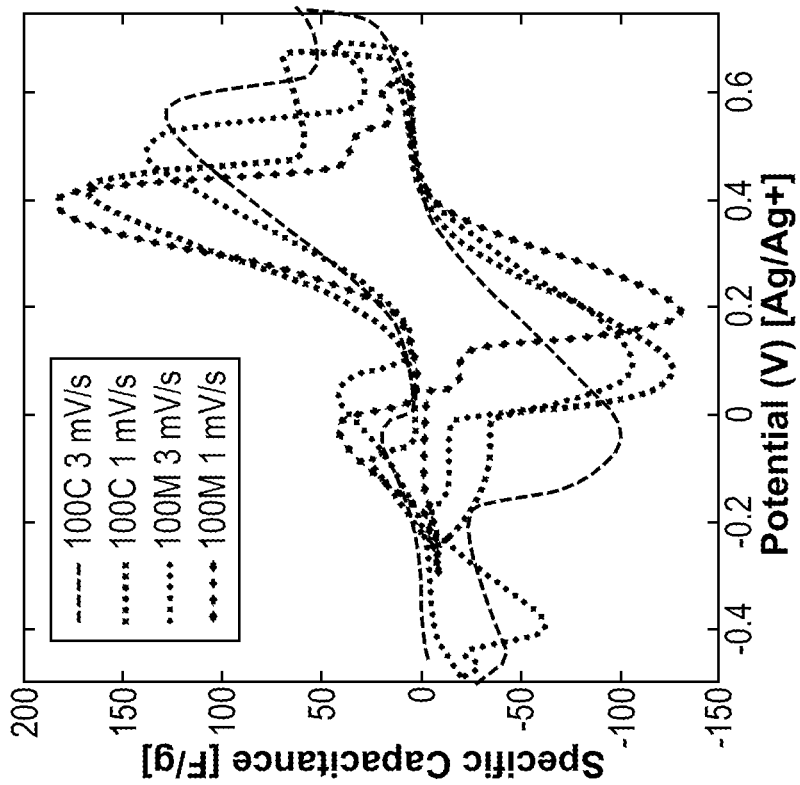
Figures 4E, 4F:
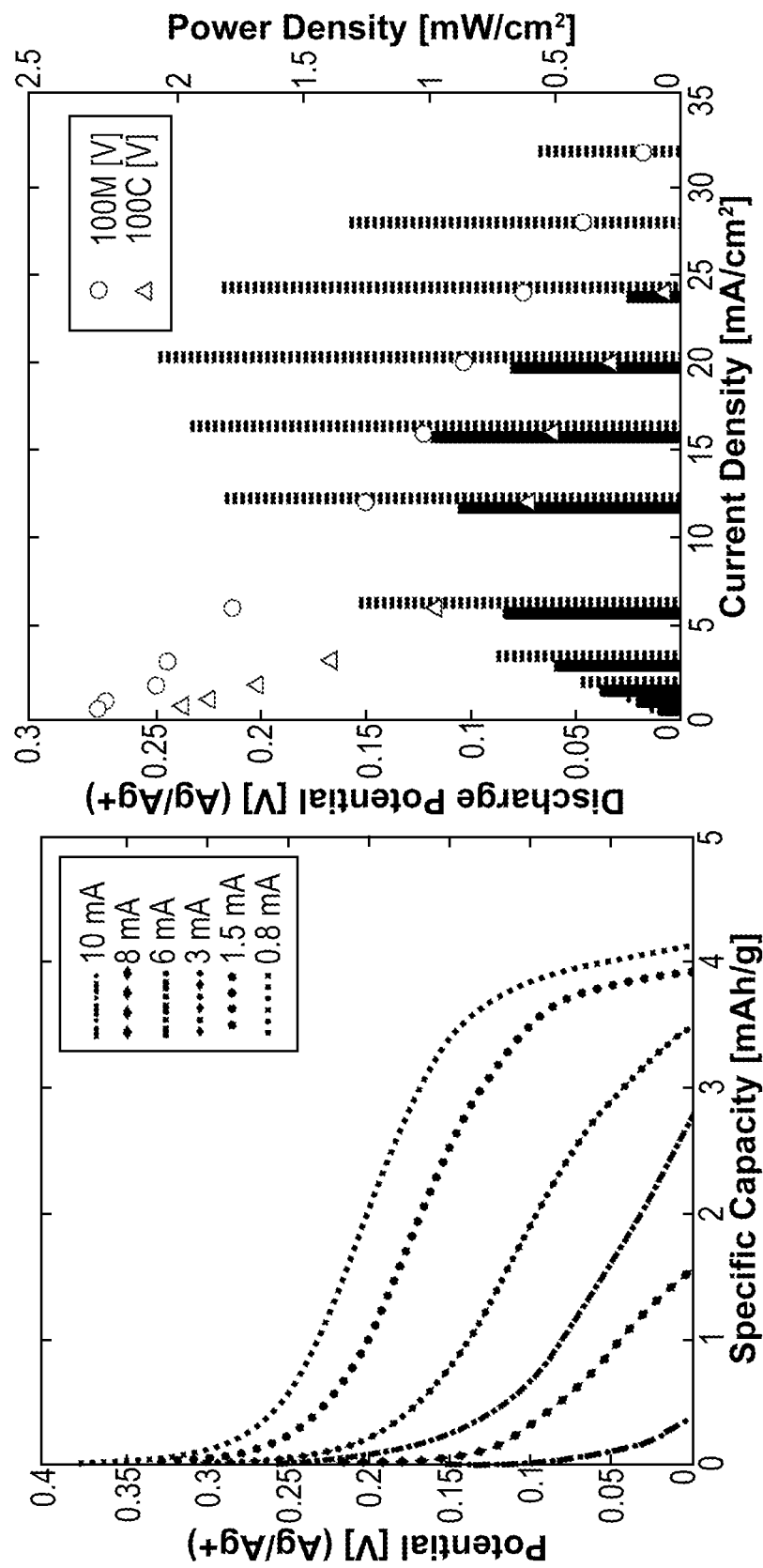

Pure 1 M NaOH acts as a reserve of available hydroxide ions to counteract electrochemical interactions across the membrane. Iron redox mediators in M-CNT electrodes allow for increased Faradaic charge transfer at the interface by providing "hot spots" for $Fe^{2+}/Fe^{3+}$ charge transfer. CV at 3 and 1 mV s$^{-1}$ with catholyte solutions show this phenomenon in FIG. 4a through improved voltage efficiency of M-CNT electrodes. FIG. 4a shows slow CV scans of 3 & 1 mV/x of M-CNT (solid lines) and C-CNT (dashed lines). Superior voltage efficiency is attributed to improved kinetics of charge transfer interactions at the electrode/electrolyte interface at these low current conditions. This is attributed to lower activation charge transfer resistances in catholytes. FIG. 4d graphically illustrates the potentials from CV curves at various scan rates with M-CNT and C-CNT electrodes. As illustrated, including iron nanoparticles increases the maximum obtainable redox discharge potential and decreases the rate of decline associated with higher scan rates. Containing a lower response to increasing sweep rates is indicative of lower internal Ohmic losses associated with the charge transfer reaction. This leads to high discharge potentials at all scan rates which leads to improved power density. Power density is easily calculable utilizing Ohm's law of power density which is equal to current density multiplied by discharge voltage. FIG. 4f graphically illustrates the power density and discharge as a function of power density.

Faster charge transfer kinetics are represented in galvanostatic charge/discharge (CD) experimentation. CD curves display the energy a battery can maintain at specified currents; therefore, it is important that high discharge potentials are maintained for longer discharge times leading to higher capacities and power densities. In real systems, batteries are considered "discharged" when they cannot deliver the power necessary to run the device. This is modeled by CD curves where the potential sharply decreases after the linear region, associated with redox behavior occurring. M-CNT electrodes reveal superior discharge performance at all currents relative to C-CNT electrodes and are able to retain the full redox behavior at higher currents. FIG. 4b graphically illustrates CD performance of M-CNT electrodes at different discharge rates. FIG. 4e graphically illustrates CD performance of C-CNT electrodes at different discharge rates. These figures illustrate more horizontal redox regions and elevated shut-off potentials of M-CNT electrodes compared to unmodified electrodes. RFB energy characteristics are determined by the electrolyte; therefore maximum capable energy densities for both systems should be equivalent. M-CNT and C-CNT show similar specific capacities at slow currents satisfying this assumption, although this maximum energy is preserved for M-CNT electrodes at higher power. This occurs because the improved Faradaic charge transfer correlated with the presence of iron nanoparticles.

From Ohm's Law, power densities can be calculated from CD curves to give applicable single electrode performance based on the following formulas:

power density=current density*discharge potential and energy density=power density*discharge time where power density is W/Kg, current density is A/Kg, discharge potential is V vs. Ag/Ag$^+$, energy density is Wh/Kg, power density is W/Kg$^{-1}$ and discharge time is hours. Discharge potential is obtained from averaging the linear region and discharge time is from the onset of the discharge cycle till the consummation of the redox behaving region. For half-cell systems, an anodic potential of 0 and the cathodic potential calculated above were used to calculate power densities shown in the Ragone plot and polarization curves. For coin cell system, the cell potential was used to calculate the power density. Polarization curves, which show discharge potential and power density as a function of discharge current density were initially used to analyze full cell systems to determine the effects of common resistances such as kinetic activation polarization (low currents), Ohmic resistances (medium currents), catalyst layer mass transport resistance, and mass transport resistance (high currents). Power increases with current in polarization curves until inherit mass transfer limitations of the electrode inhibits power from escalating on the same trajectory and causes a maximum as seen in the polarization and Ragone plots. The power decreases until the redox peak is unable to be captured within the testing potential window.

The catholyte polarization curve is mostly covered in the kinetically limited region because current densities are predominantly below 20 mA cm$^{-2}$. The higher discharge potentials in the region from 0-20 mA cm$^{-2}$ for M-CNT electrodes compared to C-CNT electrodes indicates that charge transfer requires less energy to overcome the barriers to electron transfer at the electrode/electrolyte interface. Without being limited to theory this is attributed to the iron nanoparticles in the electrode, functioning as active redox components, providing additional and lower energy charge transfer sites. The iron particles can be oxidized/reduced to more rapidly facilitate charge transfer into or out of the carbon electrodes. Iron nanoparticles enhance charge transfer because they can donate/accept electrons due to their stability in ferric and ferrous oxidation states. Catholyte polarization curves do begin to enter the Ohmic resistance region, but they do not retain sufficient redox capabilities at elevated currents. Active redox components, such as iron particles, lead to improved power density. When normalized by electrode mass the maximum power density for M-CNT electrodes is 366.2 W Kg$^{-1}$ (2.09 mW cm$^{-2}$) and for C-CNT electrodes 144.6 W Kg$^{-1}$ (0.99 mW cm$^{-2}$). Introducing iron nanoparticles into electrodes allows for improved charge transfer kinetics that leads to increased power capabilities.

Ragone plots compare the power and energy densities of electrochemical energy storage devices to provide a platform for comparison of power and energy densities that devices can operate. FIG. 4c graphically illustrates a Ragone plot of M-CNT and C-CNT electrodes with 0 voltage anodic potential assumed. The data is calculated from galvanostatic CD experiments with the methods mentioned previously. Electrolyte masses are collected before electrochemical testing and possess a density of 1.25 g mL$^{-1}$. The Ragone data reveals a consistent maximum energy between the two electrodes of 1.4 Wh L$^{-1}$, although M-CNT electrodes contain twice the power density of C-CNT electrodes at 2.09 mW cm$^{-2}$ and 0.99 mW cm$^{-2}$, respectively. Consistent energy density is expected because RFBs energy is dependent on electrolyte characteristics, amount of redox species in the electrolyte solution, and the same electrolyte is used for all testing. These improved power characteristics will allow for more efficient electrical energy storage of energy from intermittent energy generation techniques due to diminished activation energies of charge transfer and faster charge characteristics.

Similar experiments were performed with both electrodes in the anolyte; 0.35 M ferric sulfate, 0.4 M sodium chloride, 1:4 mass ratio of triethanolamine to electrolyte, in 3 M sodium hydroxide. Electrodes were activated in acid as describe above and soaked in the electrolyte overnight. They were wicked dry of excess electrolyte and then placed in the simulated half-cell configuration. These cells were also separated from pure 1 M sodium hydroxide with alkaline modified Nafion™ and were stabilized via CV performed at 10 mV s$^{-1}$ from –2-0 V (Ag/AgCl) until steady-state was reached. The anolyte was constructed by first adding the sodium hydroxide to DI water, stirring until the sodium hydroxide pellets were dissolved, then adding the sodium chloride, stirring until dissolved, adding both ferric sulfate and triethanolamine preferably stored under a nitrogen blanket, and stirring for two hours at 50° C. until the electrolyte was uniform.

Figure 5B:
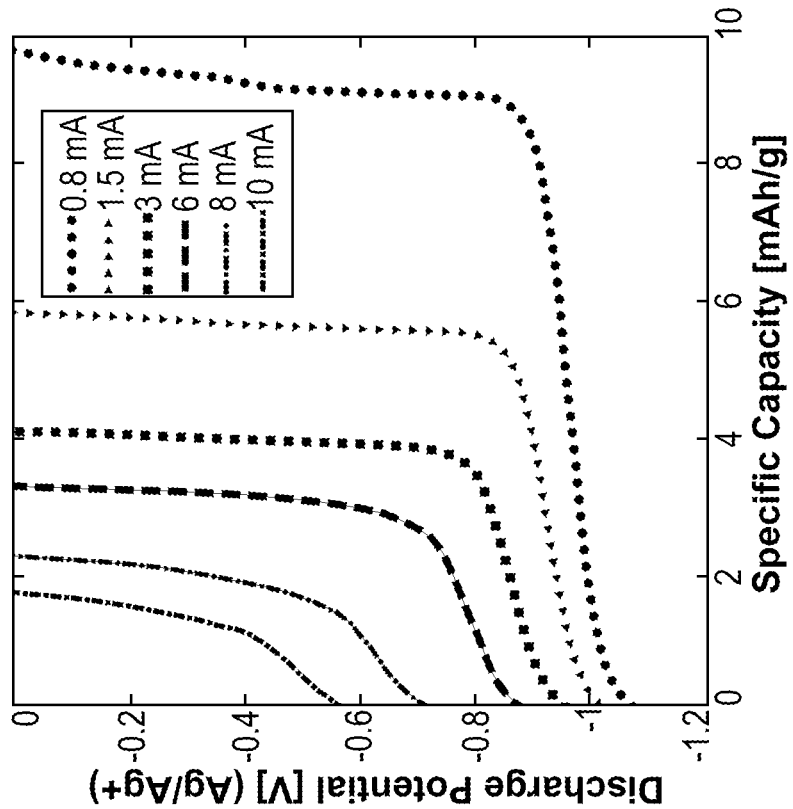
FIGS. 5a-5f graphically illustrates the electrochemical performance in a simulated half-cell configuration with the anolyte.
Figure 5A:
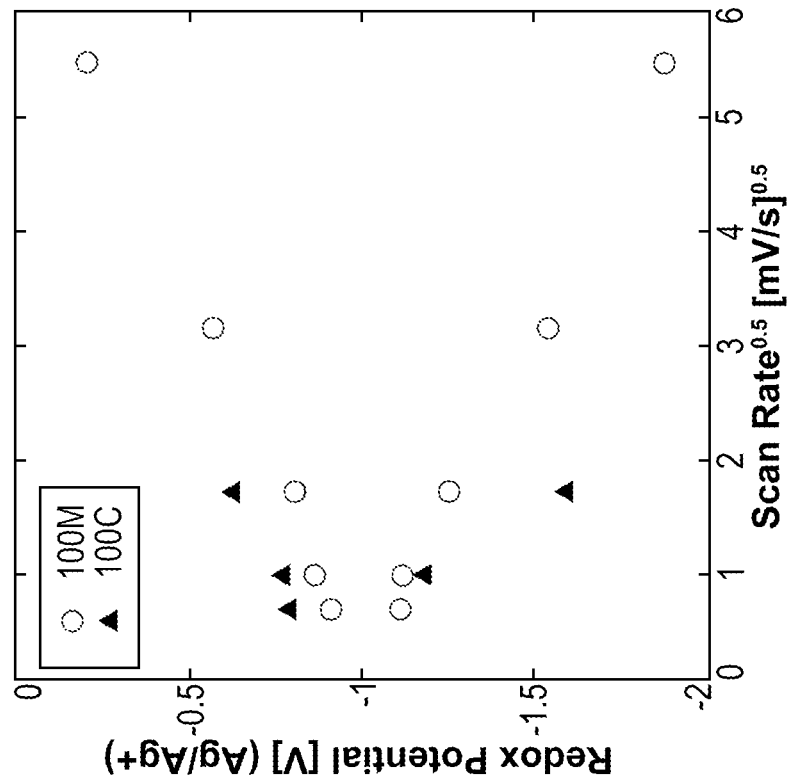
Figure 5D:
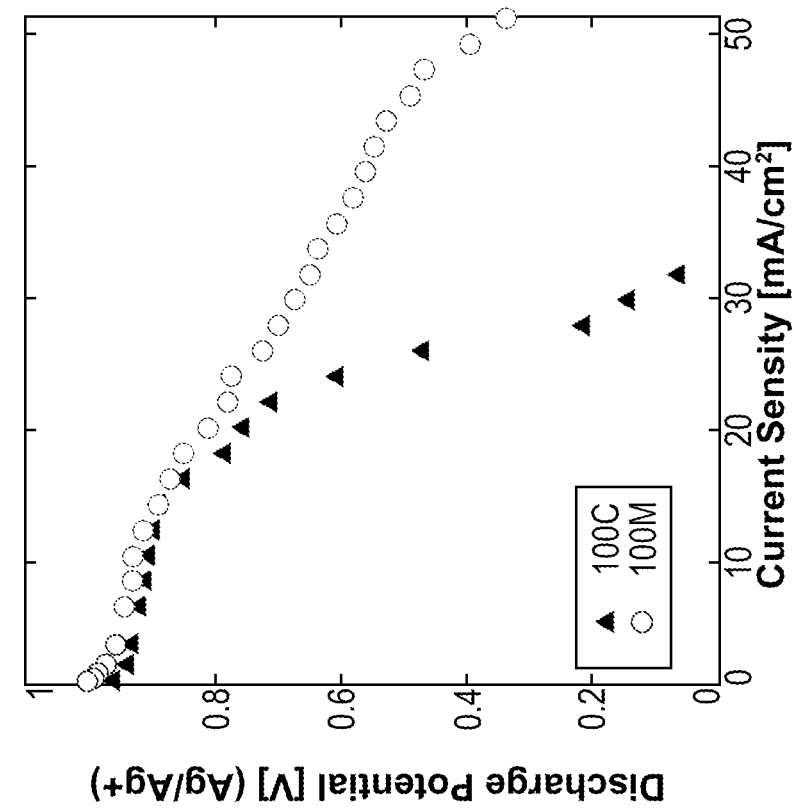

CV measurements on the anolyte solutions were conducted from –2 to 0 V and FIG. 5a graphically illustrates the anodic potentials at various scan rates for M-CNT and C-CNT electrodes. Consistent with previous catholyte results, the C-CNT electrode potentials are more sensitive to scan rate than their M-CNT counterparts because of reaction limitations. FIG. 5a illustrates CV curves at 3 and 1 mV s$^{-1}$, normalized by electrolyte mass, indicating the higher discharge potential associated with the inventive electrodes. These slow scan rates are low enough to measure the activation properties of the electrode/electrolyte interface and show decreased activation energy needed for M-CNT electrodes in the catholyte and anolyte systems. These lower energies required for activation are associated with the rapid charge transfer to and from the iron nanoparticles, as representative active redox compounds, present in M-CNT electrodes. Secondary cathodic peaks are affiliated with iron-ligand (TEOA) complexes which also occur. Superior voltage efficiency is again presented at all scan rates for M-CNT electrodes compared to C-CNT electrodes. FIG. 5d illustrates discharge potentials versus discharge current from CD experiments. The full redox peaks could not be captured for C-CNT electrodes s at scan rates above 3 mV/s whereas the full redox peak were captured at 30 mV/s for M-CNT electrodes further demonstrating the increase electrochemical performance or faster charge transfer rates.

Figure 5C:
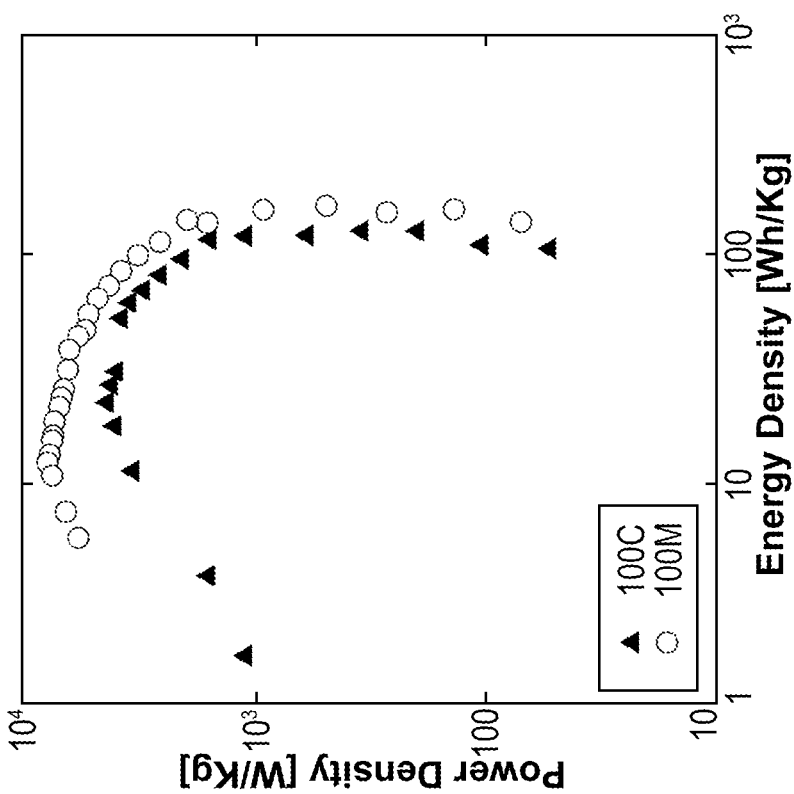
Figure 5F:
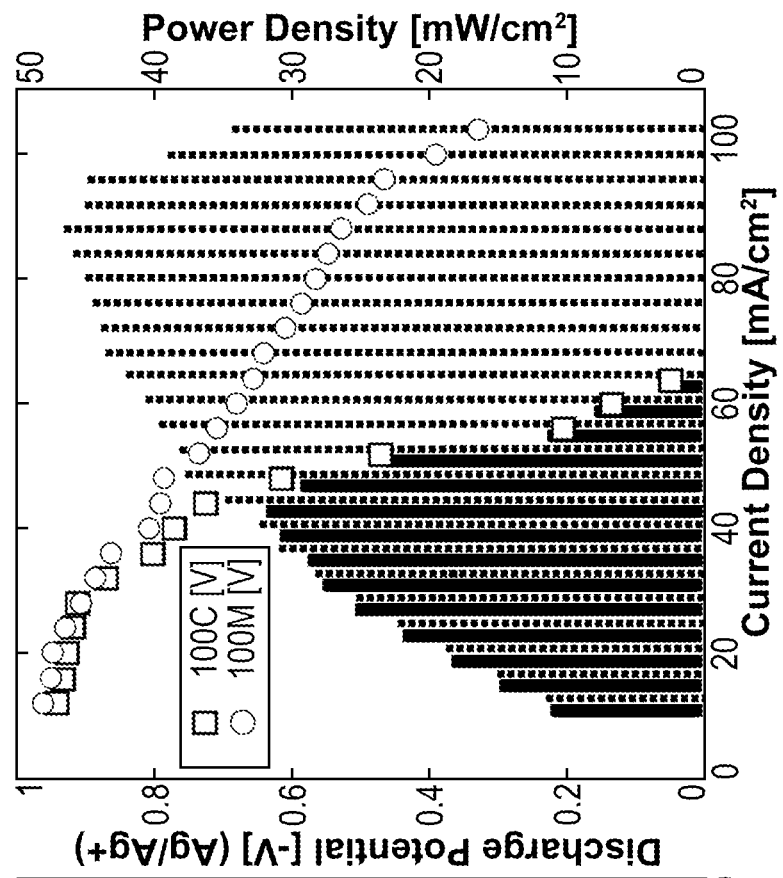
Figure 5E:
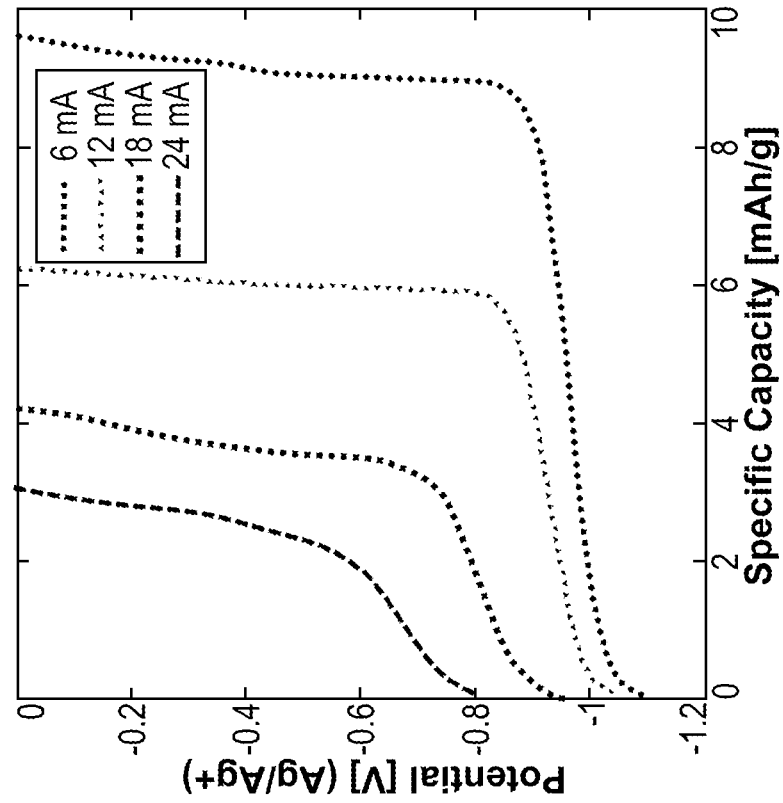

Slightly elevated discharge potentials are present at discharge currents less than 18 mA for M-CNT electrodes, although above 18 mA C-CNT electrodes require a higher potential driving force to oxidize the electrolyte effectively. This causes the potential to drop drastically which is likely associated with mass transfer and electronic resistances for purified electrode systems whereas the inventive modified electrode potentials decrease at approximately a constant rate solely associated with Ohmic resistance internal to the electrode. Decreased electrode resistance and lower charge transfer activation energy permits the improved electrode systems to maintain higher discharge potentials at larger current densities. CD curves in anolyte solutions are extremely close to ideal, with redox (linear) regions approaching horizontal and regions after their shut off potential being almost vertical. This means that almost all of the capacity is useable at elevated power. FIG. 5b graphically illustrates CD performance of M-CNT electrodes at different discharge currents. FIG. 5e graphically illustrates CD performance of C-CNT electrodes at different discharge currents. At currents exceeding 18 mA C-CNT electrodes start to deviate from the ideal shape and drastically decrease in discharge potential after 48 mA cm$^{-2}$. M-CNT electrodes start to deviate from ideal behavior at about 96 mA cm$^{-2}$, although they do not experience severe reduction in potential with increasing currents. M-CNTs are able to maintain high electrochemical performance over amplified currents, which lead to support improved power density and will decrease the cost (battery size) of incorporating redox flow batteries to grid-scale technologies.

The polarization curves of electrodes evaluated in the anolyte system show a similar trend in power density at low currents before Ohmic and ion transfer limitations of C-CNT electrodes inhibit electrochemical performance. FIG. 5f graphically illustrates polarization curves of M-CNT (100M) and C-CNT (100C) electrodes. Near linear decreases in anodic potential for M-CNT electrodes are presented through a wide current density, although when mass transfer restraints begin the maximum power density is obtained. Sharp decreases in potential with increasing current density are generally associated with mass transfer limitations but RFBs utilize electrolytes for their charge transfer interactions. Therefore, mass transfer limitations are occurring due to differences in efficiencies of iron usage from the electrolyte by the electrode in its active layers. The inventive electrodes are able to operate closer to theoretical capacities and therefore do not demonstrate these limitations that are displayed by purified electrodes at about 48 mA $cm^{-2}$. This occurs because the system is limited by mass transport within the electrodes therefore the electrode is unable to support the requested current density. Constant decreases in potential with increasing current densities are associated with Ohmic losses at intermediate current densities. Electrical resistance in the electrode active layers, are the dominating resistance in the Ohmic limited region and is dependent on applied current. These resistances are lower in M-CNT electrodes because iron nanoparticles facilitate charge transfer within the active layers.

Ragone plots demonstrating constant energy between both electrodes is exhibited at 13.5 Wh $L^{-1}$ (110 W $Kg^{-1}$ electrode mass), which matches the literature on RFBs because energy is based on the amount of redox species present in the electrolyte. FIG. 5c is a Ragone plot of M-CNT and C-CNT electrodes tested in the anolyte redox systems with cathodic potential assumed to be zero volts. When normalized by electrode mass the M-CNT electrodes have a maximum power density of 8123 W $Kg^{-1}$ (46.5 mW $cm^{-2}$) and C-CNT electrodes have a maximum of 4643 W $Kg^{-1}$ (31.8 mW $cm^{-2}$). Power calculations were conducted assuming cathodic potentials of 0 Vs vs. Ag/AgCl for all experiments and using Ohm's law as previously explained. Increased power density is associated with lower electrical resistance to charge transfer leading to better redox species utilization efficiency as exemplified in the polarization curves. Iron based anolyte solutions paired with inventive M-CNT electrodes facilitate charge transfer kinetics at electrode/electrolyte interfaces to produce systems with increases power capabilities.

To simulate an RFB, an adaptation to common coin cell experiments was developed in order to incorporate both electrolytes without allowing them the possibility of physically interacting. This was attained by activating the cathode and anode in acidic conditions and immersing them in their perspective redox electrolytes overnight as discussed above. By analyzing the simulated half-cell data the optimal ratio of electrolytes was determined to be about 5:6 anolyte to catholyte to ensure the capacity of each was balanced. Anolyte masses were specified to be 5 times the anode mass and catholyte masses were adjusted to match even though the masses of each electrode were approximately equal. This was enacted by determining the mass of the dry electrodes before acidic activation and then the redox soaked electrode was wicked, to the appropriate ratio of electrolytes by mass. Nafion™ separators were activated in larger sheets for coin cell configurations. Therefore, they could be cut to have excess Nafion™ on all sides. This ensures that upon pressurization the electrolytes cannot mix and excess Nafion™ was extracted by the crimping mechanism. Coin cells were pressurized to 1000 psig for about a minute. Excess Nafion™ was discarded and the remaining coin cell was tested with the potentiostat in a two-electrode set up. Coin cells had an active area of 0.5 $cm^2$ because of the current constraints of the activation system.

These coin cells with two separate redox electrolytes had to be activated slowly to achieve a stable redox peak. Therefore, CV was performed at 10 mV/s from 0.5-2 V for 15 cycles. As cycling continued a discharge peak appears between 1 and 1.3 V and gradually increased with each cycle until it was stable. This occurs because both electrolytes are in their neutral charged state before experimentation and the applied potential gradually charges the cell. Following stabilization, EIS experiments were conducted at 1 V and were repeated after CD experiments of 100 mA/$cm^2$. Then, CD experimentation was performed starting at 6 mA/$cm^2$ and increasing until no discernable redox peak was displayed by discharge behavior. CD curves are summarized in FIGS. 6a and 6d where the sharp contrasts between the modified and purified electrode performance from half-cell experiments is improved upon.

Figures 6C, 6D:
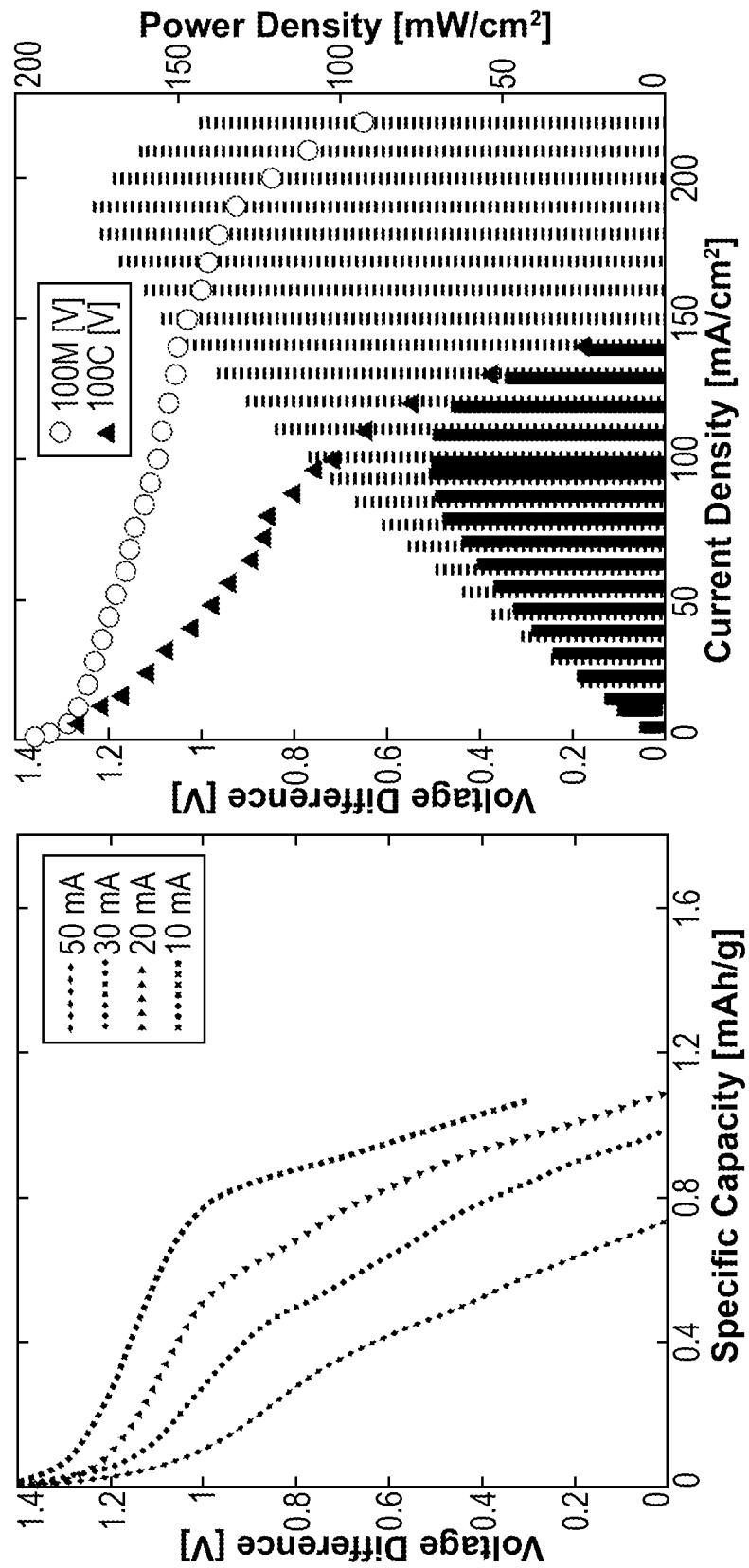

FIG. 6a graphically illustrates the CD discharge curves of cells based on M-CNT electrodes at various discharge rates. FIG. 6d graphically illustrates polarization curves of cells based on C-CNT electrodes (100C). From FIGS. 6a and 6d it is apparent that the purified electrodes are unable to sustain high discharge potentials as current density increases to the extent that the modified electrodes are able to achieve, which affects the power density of the cells. In addition, C-CNTs cannot achieve a sufficient discharge potential above a discharge current of 100 mA/$cm^2$, although M-CNTs hold their redox potentials at currents to about 200 mA/$cm^2$. Despite these differences in performance, the Nernst potential of both of these systems is equivalent due to the charge transfer mechanisms within the redox electrolytes of the RFB system. Cells based on M-CNT electrodes exhibit a lesser decrease in discharge voltage with increasing current density, indicative of smaller overpotentials under more aggressive discharge conditions. If we then apply Ohm's law (P=iE), elevated discharge voltages at higher current densities gives significantly higher power densities.

FIG. 6b graphically illustrates a comparison of the discharge voltage of the batteries with respect to current density and the IR-free voltage of the batteries with respect to current density. FIG. 6c graphically illustrates CD discharge curves of C-CNT electrodes at various discharge rates.

The discrepancy between coin cells fabricated with iron-containing and iron-free electrodes was larger than expected and is attributed to the combination of faster kinetics, lower electrical resistance, and increased electron transfer efficiency previously seen in anodic and cathodic half-cell configurations.

To further understand the improved performance, further analysis into the resistances that occur at the electrode/electrolyte interface needs to be explained. EIS experiments cannot fully account for the linear decease of discharge voltage versus current density because it does not take into effect the mass transfer losses "pseudo-iR" losses, which occurs due to EIS experiments shorting the electrode during experimentation. To determine the areal surface resistance (ASR), discharge voltages were plotted versus their current densities and the linear regions were fit to a line with the slope being the ASR and the y-intercept being the iR-free voltage after activation losses. If the iR-free voltage is higher this means that there is less overpotential associated with activation resistances. Devices with iron-containing electrode exhibited an ASR of 1.84 $\Omega cm^2$ (area=0.5 $cm^2$) and those with purified electrodes exhibited an ASR of 4.32 $\Omega cm^2$. These resistances are then multiplied by the current density for each GCD and added to the discharge voltage for that GCD curve to obtain the iR-free voltage at each current density. This essentially cancels out the Ohmic resistance of the cell in order to easily represent whether activation, Ohmic, or mass transfer losses are dominating the resistances at a certain current density. IR-free voltages for the modified electrodes was 1.28 V and for purified electrodes was 1.18 V meaning purified electrodes experience more overpotential due to activation resistances.

Each of these resistances has a different relationship with increasing current density as shown in FIG. 6f. Activation losses logarithmically decrease, Ohmic losses linearly increase, and mass transport losses logarithmically increase with increasing current densities. IR-free voltages versus current density reveal a linear region with a slope of 0 where Ohmic losses are the primary charging resistance. Therefore, an understanding of where each of these three resistances "controls" the device is easily discernable by where the iR-free voltage deviates from the 0 slope profile with activation "control" occurring at lower current densities and mass transfer "control" occurring at higher current densities.

In the 0 slope regions for M-CNT devices, the activation losses are the most prominent resistance, before about 24 mA/cm$^2$, and the mass transfer limiting currents begin at about 200 mA/cm$^2$. For purified electrode devices, the activation losses control the voltage behavior until about 48 mA/cm$^2$ and mass transfer limitations control the voltage behavior starting at 100 mA/cm$^2$. Also the 0 slope iR-free voltage occurs at about 1.28 V for modified electrode devices and occurs at about 1.18 V for purified electrode devices, which reveals that purified electrodes experience increased activation resistance relative to modified electrodes. The presence of, active redox components, such as the iron nanoparticles demonstrated experimentally, causes this phenomena because it acts as a catalyst to charge transfer, which means that less energy is needed to initiate the charge transfer at the electrode/electrolyte interface.

As previously mentioned, the ASR for M-CNT devices is 1.84 Ωcm$^2$ and the ASR for C-CNT devices is 4.32 Ωcm$^2$. Therefore, even at 0 slope iR-free voltage, the real discharge voltage is decreasing more than twice as rapidly for C-CNT devices than for the M-CNT devices. Contact resistances between these two devices is assumed to be the same for this discussion due to the cells being identical. Therefore, these differences in apparent ASR are associated with improved 'pseudo-iR' losses and improved ionic resistances within the modified electrode systems. The current density where mass transfer limitations begin to occur is where the maximum power density will occur. These mass transfer resistances do not become dominant until higher current densities in cells with iron-modified electrodes since the iron particles lower activation energy for charge transfer and lower Ohmic resistances with modified electrode systems lead to higher energy conversion and storage. This also results in improved energy density of the overall system.

When considering the performance of full RFBs, the most prominent energy storage metrics are the power and energy densities, which are decoupled in RFBs. Energy density is dependent on concentration of electrolytes and the external tank sizes. From concentration and external tank size, raw material transition metal loads can be determined and therefore higher specific energies with uniform concentrations diminish materials costs. Power density is dependent on the area of the electrodes and limits on charge transfer at the electrode/electrolyte interface. Higher power systems support increased harnessing efficiency of energy generated from intermittent sources and cheaper membrane separator costs. Therefore, the Ragone plot was normalized by the unit of interest for power and energy densities to make our plot more applicable to real systems as demonstrated graphically in FIG. 6b.

Inventive M-CNT coin cells show a slight increase in energy density 1.80-1.15 Wh L$^{-1}$ which is attributed to these devices having greater conversion rate of charge transfer at the electrode/electrolyte interface as a result of the active redox components. Similar energy densities are expected because energy density is dependent on electrolyte composition, although higher utilization of available ions permits improved energy densities. This 36% increase in energy density will decrease the size of external tanks needed to supply the same energy therefore saving transition metal material costs. Power density improvements are about 141% with M-CNT coin cells with a maximum power density of 176 mW cm$^{-2}$ for M-CNT coin cells and 73.0 mW cm$^{-2}$ for C-CNT coin cells. These maximum power densities occurred at 190 mA cm$^{-2}$ and 96 mA cm$^{-2}$ for M-CNT and C-CNT electrodes respectively.

The polarization curve is again used to determine the limits on charge transfer for both types of coin cells. At low current densities (0 and 20 mA cm$^{-2}$), coin cells comprising M-CNT are kinetically restrained and therefore exhibit higher voltages due to faster electron transfer resulting from lower activation energies. Intermediate current densities contain a linear decrease in discharge voltage versus current density and are associated with Ohmic resistances. Coins cells comprising C-CNT electrodes have a more negative slope in this region because of higher 'psuedo-iR' and internal electrical resistances in the active layers of the electrode. These resistances are lessened by iron nanoparticles, as active redox components, in M-CNT coin cells. A significant drop in discharge voltage occurs for C-CNT coin cells when current densities reach 100 mA cm$^{-2}$ correlated with ion transfer limitations of the bulk electrolyte to the charge transfer interfaces. M-CNT electrodes do not exhibit these limitations until 200 mA cm$^{-2}$ because of their lower activation energies for electron transfer and improved Ohmic resistances, which lead to more efficient conversion rates between the electrode and the electrolyte. This enables M-CNT coin cells to perform closer to theoretical standards for redox electrolytes, such as iron-based electrolytes, by increasing the current densities that electron transfer limitations begin to dominate. The improved electrochemical performance revealed in the simulated half-cell experiments is transferrable to full batteries and therefore offers the opportunity for exceptional energy harvesting potential for the batteries that would decrease material costs.

Increased electrochemical performance of the inventive electrodes provide optimism for improved power and energy densities in flowing electrolyte systems due to their lower resistances. It is understood in the art that low electrolyte flow rates the observed current density is about a quarter of the theoretical density although as flow rate increases the percentage of observed versus theoretical current densities decreases rapidly. Also, the slope increases, becomes less negative, In the Ohmically controlled region of the voltage versus current density plot with increasing electrolytic flow rate. Higher conversion rates of available redox solutes by the iron modified electrodes, as exemplary redox electrolytes, will further extend mass transfer limiting currents permitting greatly improved power densities pertinent to decrease RFB costs. Lower Ohmic resistances lead to higher power densities by increasing the voltage before the mass transfer limiting current density occurs, and by applying Ohm's law (P=iE), will improve the maximum obtainable power densities. These costs are largely the membrane and manufacturing cost. Higher conversion rates will also increase the range of allowable energy densities and reduce solute costs for these aqueous electrolytes. The coin cell configuration tests are currently matching the published observed maximum for power density of all-iron redox solute-based RFB but with the inventive technology and flowing electrolytes this current barrier will be far surpassed.

Figure 7D:
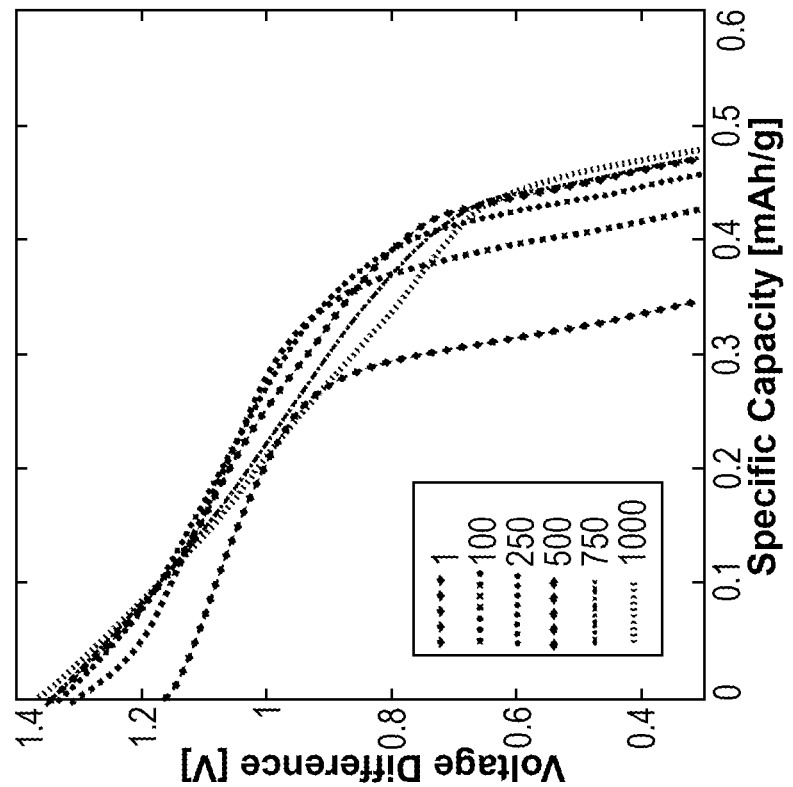
Figure 7C:
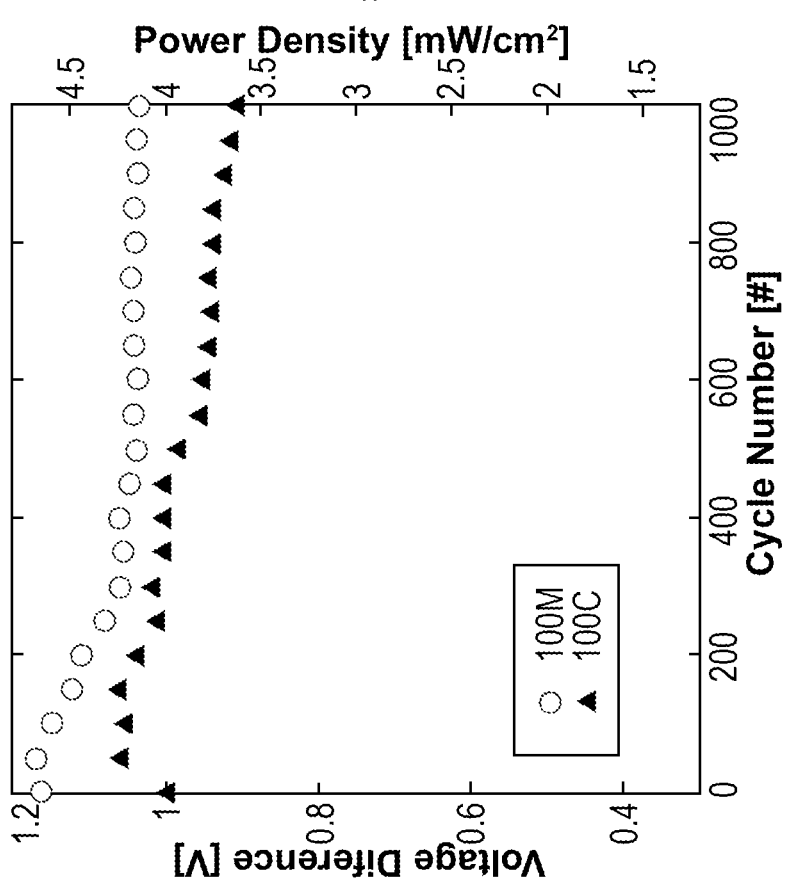

Stability of coin cells was investigated to arbitrate the lifetime of these devices. GCD experimentation was conducted at 4 mA/cm$^2$ for 1000 cycles, which represents about 3 years if charged and discharged daily, and interpreted for disparities in capacity and discharge voltage. FIG. 7b graphically illustrates the galvanostatic discharge curves of inventive coin cells at 4 mA/cm2 for various cycles after device activation and normalized by available electrolyte mass. FIG. 7d graphically illustrates galvanostatic discharge curves of coin cells with purified electrodes at 4 mA/cm$^2$ for various cycles after device activation and normalized by available electrolyte mass. It is important to note that these systems are sealed and not flowing as RFBs would and therefore their degradation rates will be rapid compared to real RFB devices. M-CNT coin cells hold a constant discharge voltage, capacity, and coulombic efficiency from cycle 500 through 1000. FIG. 7c graphically illustrates voltage difference and power density to cycle number for coin cells comprising M-CNT electrodes (100M) and those containing purified C-CNT electrodes (100C) obtained from repeated charge/discharge testing. Power is directly dependent on voltage and all of these experiments are conducted at the same current, therefore voltage is analogous with power density. C-CNT coin cells decrease in discharge voltage with cycle life after the initial cycles which lower the power capabilities of the device. Coulombic efficiency for both coin cells after cycle 400 holds steady at about 95% and therefore the capacity of the cell also holds. FIG. 7a graphically illustrates the effect of repeated cycling on coulombic efficiency for coin cells containing M-CNT electrodes (100M) and those containing purified C-CNT electrodes (100° C.) attained from charge/discharge testing. Galvanic CD (GCD) profiles display C-CNT coin cells shut-off voltage decreases faster with cycle number than M-CNT coin cells leading to decreasing power density performance. M-CNT coin cells will be able to maintain appropriate operating conditions for longer and therefore, will require less replacement of electrodes and electrolytes saving maintenance costs for the RFB.

An RFB was prepared comprising a PTFE split cell from MTI corps, a mechanical jig, Dual channel peristaltic pumps, and a 4-channel battery analyzer from Arbin Instruments (MSTAT21044). The cell was connected to the battery analyzer for testing. Charge discharge tests were run using MITS Pro 8.0 Software from Arbin Instruments. The main components of the RFB cell that were not standard components were the electrodes, the separator and the electrolyte. For the battery tests, a 212 Nafion membrane and electrodes comprising carbon nanotubes from NTL, either M-grade with iron or C-grade without iron, were used.

To solve the problem of electrolyte crossover, and also to evaluate other redox chemistries, a zinc-based electrolyte system was studied that was symmetric utilizing the same electrolyte for the catholyte and anolyte which was a 1M potassium iodide and 0.5M zinc bromide in 1M potassium chloride. This system demonstrated significant technological and commercial advantages, as one of the main issues facing RFBs is not present. The zinc-based system was then tested in the RFB prototype. After assembling the cell with the necessary components, standard battery tests were performed with increasing current to determine the maximum power density for various flow rates up to those used on a commercial scale. Using the Arbin battery tester, in a charge-discharge experiment, the performance of cells having an electrode area is 9 cm were tested in a stationary flow at 100, 150, 200 mA. RFB cells were testing using electrodes containing M grade iron and also with C grade carbon-only electrodes. The RFB cells containing the electrodes with iron exhibited a substantial improvement in performance over RFB cells with carbon only electrodes. The results suggests that the inventive materials could be readily integrated into commercial systems that use zinc or iron-based electrolytes to realize immediate benefits. The RFB cells containing the electrodes with iron were evaluated using a current of 100 mA, 22.2 mA/cm$^2$, with increasing electrolyte flow rates up to 60 mL/min. As expected, the RFB showed an increase in performance with increasing flow rate. These results indicate that the carbon electrodes with a redox mediator are beneficial for various aqueous redox chemistries.

U.S. Pat. Nos. 8,609,270; 4,814,241 and 10,337,098 and U.S. Publ. Appl. Nos. 20170179516 and 20130209807 are incorporated herein by reference.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:
1. A redox flow battery comprising:
an anode comprising an anodic redox component;
a negative electrolyte tank comprising an anolyte;
an anode pump capable of circulating said anolyte through said anode;
a cathode comprising a cathodic redox component;
a positive electrolyte tank comprising a catholyte;
a cathode pump capable of circulating said catholyte through said cathode;
a separator between said anode and cathode; and
wherein at least one of said anodic redox component or said cathode redox component is an organometallic particle wherein said organometallic particle comprises a transition metal, a transition metal oxide or a transition metal carbide and wherein said transition metal is selected from the group consisting of Fe, Co, Ni, Cu, Zn, Mn, Cr, Mo and V.
2. A redox flow battery comprising:
an anode comprising an anodic redox component;
a negative electrolyte tank comprising an anolyte;
an anode pump capable of circulating said anolyte through said anode;
a cathode comprising a cathodic redox component;
a positive electrolyte tank comprising a catholyte;
a cathode pump capable of circulating said catholyte through said cathode;
a separator between said anode and cathode; and
wherein at least one of said anodic redox component or said cathode redox component is selected from the group consisting of a polymer and a small molecule organic compound.
3. A redox flow battery comprising:
an anode comprising an anodic redox component;
a negative electrolyte tank comprising an anolyte;
an anode pump capable of circulating said anolyte through said anode;
a cathode comprising a cathodic redox component;

a positive electrolyte tank comprising a catholyte;
a cathode pump capable of circulating said catholyte through said cathode; and
a separator between said anode and cathode;
wherein at least one of said anodic redox component or said cathode redox component is an organometallic particle wherein said organometallic particle comprises a transition metal, a transition metal oxide or a transition metal carbide wherein said transition metal is selected from the group consisting of Fe, Ni, Cu, Zn, Mn and Cr.

4. The redox flow battery of claim 3 wherein said transition metal is Fe.

5. The redox flow battery of claim 1 wherein at least one of said anode or said cathode comprises a carbon material selected from the group consisting of a graphitic carbon, a porous carbon, a carbon felt, an allotrope of carbon, graphene and carbon nanotubes, either multi-walled carbon nanotubes or single-wall carbon nanotubes.

6. The redox flow battery of claim 5 wherein said carbon material is selected from the group consisting of a multi-walled carbon nanotube and a buckypaper of carbon nanotubes or other carbon allotropes.

7. The redox flow battery of claim 1 wherein at least one of said anode or said cathode comprises a carbon nanotubes.

8. The redox flow battery of claim 1 wherein at least one of said catholyte or said anolyte comprises a carrier medium.

9. The redox flow battery of claim 8 wherein said carrier medium a liquid.

10. The redox flow battery of claim 9 wherein said carrier medium is selected from the group consisting of water, an organic solvent and an ionic liquid.

11. The redox flow battery of claim 8 wherein said catholyte comprises at least one of an iron salt or a zinc salt.

12. The redox flow battery of claim 11 wherein said catholyte comprises $K_3Fe(CN)_6 \cdot 3H_2O$.

13. The redox flow battery of claim 8 wherein said anolyte comprises and iron salt or an iodine salt.

14. The redox flow battery of claim 13 wherein said anolyte comprises $Fe_2(SO_4)$.

15. The redox flow battery of claim 2 wherein at least one of said anode or said cathode comprises a carbon material selected from the group consisting of a graphitic carbon, a porous carbon, a carbon felt, an allotrope of carbon, graphene and carbon nanotubes, either multi-walled carbon nanotubes or single-wall carbon nanotubes.

16. The redox flow battery of claim 15 wherein said carbon material is selected from the group consisting of a multi-walled carbon nanotube and a buckypaper of carbon nanotubes or other carbon allotropes.

17. The redox flow battery of claim 2 wherein at least one of said anode or said cathode comprises a carbon nanotubes.

18. The redox flow battery of claim 2 wherein at least one of said catholyte or said anolyte comprises a carrier medium.

19. The redox flow battery of claim 18 wherein said carrier medium a liquid.

20. The redox flow battery of claim 19 wherein said carrier medium is selected from the group consisting of water, an organic solvent and an ionic liquid.

21. The redox flow battery of claim 18 wherein said catholyte comprises at least one of an iron salt or a zinc salt.

22. The redox flow battery of claim 21 wherein said catholyte comprises $K_3Fe(CN)_6 \cdot 3H_2O$.

23. The redox flow battery of claim 18 wherein said anolyte comprises and iron salt or an iodine salt.

24. The redox flow battery of claim 23 wherein said anolyte comprises $Fe_2(SO_4)$.

25. The redox flow battery of claim 3 wherein at least one of said anode or said cathode comprises a carbon material selected from the group consisting of a graphitic carbon, a porous carbon, a carbon felt, an allotrope of carbon, graphene and carbon nanotubes, either multi-walled carbon nanotubes or single-wall carbon nanotubes.

26. The redox flow battery of claim 25 wherein said carbon material is selected from the group consisting of a multi-walled carbon nanotube and a buckypaper of carbon nanotubes or other carbon allotropes.

27. The redox flow battery of claim 3 wherein at least one of said anode or said cathode comprises a carbon nanotubes.

28. The redox flow battery of claim 3 wherein at least one of said catholyte or said anolyte comprises a carrier medium.

29. The redox flow battery of claim 28 wherein said carrier medium a liquid.

30. The redox flow battery of claim 29 wherein said carrier medium is selected from the group consisting of water, an organic solvent and an ionic liquid.

31. The redox flow battery of claim 28 wherein said catholyte comprises at least one of an iron salt or a zinc salt.

32. The redox flow battery of claim 31 wherein said catholyte comprises $K_3Fe(CN)_6 \cdot 3H_2O$.

33. The redox flow battery of claim 28 wherein said anolyte comprises and iron salt or an iodine salt.

34. The redox flow battery of claim 33 wherein said anolyte comprises $Fe_2(SO_4)$.

* * * * *